Aug. 18, 1936. A. LESTI Re. 20,070

ELECTRIC TRANSLATING DEVICE FOR MUSICAL INSTRUMENTS

Original Filed June 5, 1935 2 Sheets-Sheet 1

INVENTOR
Arnold Lesti

ELECTRIC TRANSLATING DEVICE FOR MUSICAL INSTRUMENTS

Original Filed June 5, 1935 2 Sheets-Sheet 2

INVENTOR
Arnold Lesti

Reissued Aug. 18, 1936 Re. 20,070

UNITED STATES PATENT OFFICE 20,070

ELECTRIC TRANSLATING DEVICE FOR MUSICAL INSTRUMENTS

Arnold Lesti, Los Angeles, Calif.

Original No. 2,026,841, dated January 7, 1936, Serial No. 25,100, June 5, 1935. Application for reissue April 22, 1936, Serial No. 75,862

25 Claims. (Cl. 84—1)

My invention relates to an electrical translating device for use with musical instruments which are not sufficiently loud when played in the normal manner. This device translates the musical vibrations into corresponding electrical values and these are electrically amplified and then translated into corresponding sounds by a loud speaker. The invention is particularly adapted to steel stringed musical instruments such as the guitar.

An important object of my invention is to provide an adequate electrical translating device which is sufficiently small in size so that it may be easily attached to the most effective part of the musical instrument or easily detached from the same.

Another important object of my invention is employing a solenoid means which may consist of one or more electrical windings with or without a core but preferably with an iron core to form the translating device to produce electrical currents caused by the vibration of the steel strings of the musical instrument. Another important object of my invention is utilizing the same solenoid means with one or more electrical windings for magnetizing the steel strings which form the vibrating members of the musical instrument, this being done by passing a direct electric current through the solenoid means, that is, the one or more electrical windings, for a short period of time and then opening the direct current circuit prior to the playing of the instrument. In this connection I preferably provide a simplified electrical switching means whereby the player of the instrument may close the direct current circuit for a short period of time, then open this circuit and close the amplifying circuit before playing the instrument.

A further object of my invention is to provide an adequate translating device which will faithfully reproduce the musical tones of the instrument and not extraneous mechanical vibrations which may exist in the body of the instrument when it is played. I have found that this feature is met by a translating device utilizing solenoid means to produce electrical currents caused by the vibrations of the steel strings of the musical instrument; the said strings being permanently magnetized beforehand adjacent to the solenoidal pick-up device.

The solenoid means may be one or more electric windings arranged closely contiguous to all of the vibrating strings, preferably arranged with the coil or coils extending transversely across the strings of the instrument where such strings are arranged parallel or nearly parallel so that the assembly forming the solenoid means, that is, with one or more wire coils, reacts with the magnetized strings as the translating device and also functions for magnetizing all of the strings at the same time when the direct current is passed through the coil or coils for a period of short duration. With my invention when the instrument strings are magnetized and then one or more of the strings are vibrated, the magnetic field of the strings is itself placed in vibration.

In this connection, a further detailed object of my invention is to provide means of changing the relative intensities of the bass and treble notes by moving the above mentioned solenoidal device into proper relation with the magnetized portions of the steel strings. Where the solenoid device consists of one or more wire coils, such coil or coils may be adjusted to have different intensities of magnetizing effect on the bass and treble strings of the instrument and also being susceptible to different reactions in the intensity of their electrical translating action when the bass and treble strings are vibrated in the playing of the instrument.

Another important object of my invention is to provide along with the above mentioned features, a translating device which is free from pick-up action engendered by extraneous electrical and magnetic influences. These last mentioned influences are found to produce extremely objectionable noises. In the construction of my invention I have found that two or more solenoids may operate together so that each neutralizes the effects of the other insofar as extraneous unwanted magnetic influences are concerned, but that their positions with respect to the vibrating magnetic portions of the musical instrument, causes an addition or summation of their respective translating currents.

A further detailed object of my invention is to provide means for properly magnetizing the steel vibrating members of the musical instrument in a manner which will produce maximum effects. While in some cases one magnetizing coil properly arranged in regard to the strings of the instrument would be satisfactory, nevertheless it is preferable to construct the solenoid means with a plurality of electric windings or coils arranged parallel to each other and extending transversely across the strings of the musical instrument where a plurality of such strings are closely contiguous one to the other.

With the foregoing and other objects in view, which will be made manifest in the following detailed description, and more particularly in the annexed claims, reference is had to the attached drawings for an illustrative embodiment of the invention wherein, Figure 1 is a plan view of a guitar with my invention applied thereto.

Figure 3:
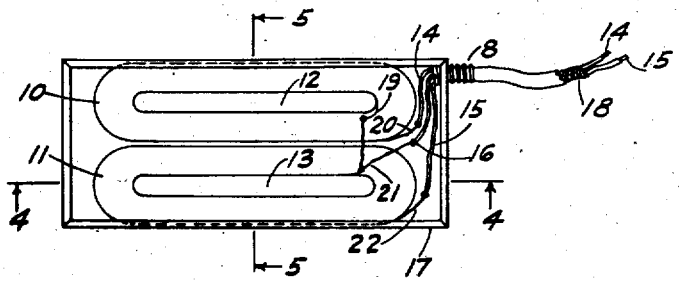
Figure 3 is a plan view of the translating device with top cover removed.

Referring to the drawings wherein similar characters represent similar parts throughout, 1 is the body of a guitar and 2 the fingering board. Character 3 represents the sound hole at which is held the translating device designated generally by 6. 7 represents generally the steel strings which are vibrated during the act of playing. Translating device 6 is held to the guitar by spring 24. The small spring 8 around the cable 9, where it enters the translating device 6, safeguards 9 from excessive wear at that point. In Figure 3 the coils 10 and 11, having iron cores 12 and 13, are shown connected to insulated leads 14 and 15 and their center connection 16 being connected to the case 17, made of magnetic material. A shielding 18 around leads 14 and 15 constitutes a return lead, also connected to the case 17. The windings in coils 10 and 11 are in opposite directions, as can be seen from the direction of the ends, 19, 20, 21 and 22. The case 17, made of magnetic material, aids in the pick-up action by reducing the magnetic reluctance, giving greater field strength from the relatively weak inductive fields surrounding strings 7. Character 23, is a non-magnetic top cover.

Figure 1:
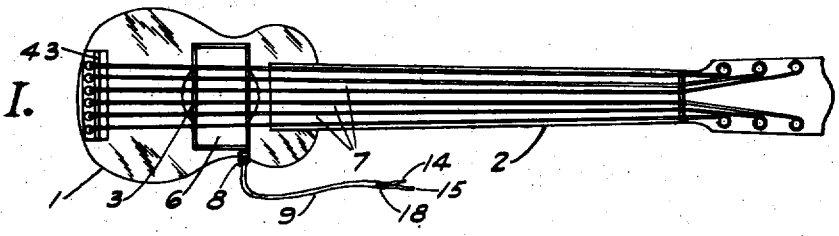
Figure 2:
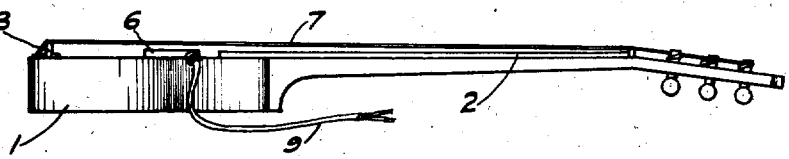
Figure 2 is a side view thereof.

While my invention is attachable to any steel stringed instrument, best results are obtained when the body of the instrument does not absorb the vibrations of the strings causing the tones to become rapidly damped. In Figure 1 and Figure 2 are shown a guitar with a smaller body 1 than the conventional, and constructed with heavy wood 25 to prevent vibration. This permits the tones to be sustained much longer yielding a more desirable effect.

Figure 6:
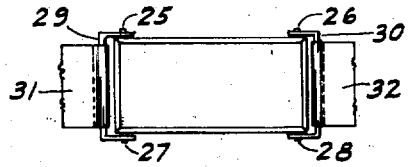
Figure 6 is a plan view of the translating device showing an alternative method of fastening the same to instruments without sound holes.

In Figure 6 pins 26, 27, and 28 hold detachable members 29 and 30, fastened to the elastic belt 31 and 32 which may be continuous around the body of the instrument to hold the translating device when the instrument has no sound hole such as the sound hole 3 in Figure 1.

Figure 4:
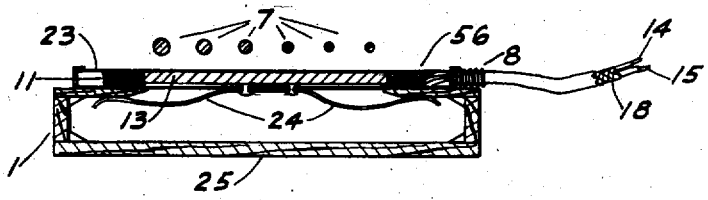
Figure 4 is a sectional view through the line 4—4 of Figure 3, and showing also how the device is held to the instrument at the sound hole.

In Figure 4 is shown a cross section of the steel strings represented generally by 7. It will be observed that core 12 and also 13 are sufficiently long to provide nearly similar magnetic reluctance to the fields surrounding each string.

Figure 7:
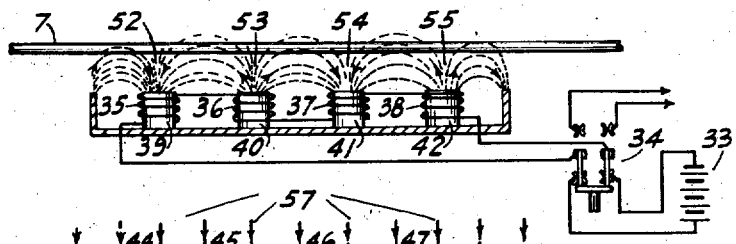
Figure 7 is a diagrammatic view of the invention illustrating four coils and cores, the method of magnetizing the steel strings, and the lines of magnetic force during the process of magnetization.

The process of magnetization is represented in detail in Figure 7 wherein 33 represents a battery, 34 a double pole throw switch connecting the coils to the battery and producing the magnetic field represented in dotted lines. Coils 35, 36, 37 and 38 are each reversed with respect to its neighbor as shown. Suitable iron cores are shown at 39, 40, 41 and 42.

The small size of the translating device 6 is due to the fact that there are no permanent magnets within it. The magnetic intensity of a permanent magnet, small enough to be placed in the device 6, would not be effective, due to the distance of the strings 7, as shown in Figure 4, to magnetize the strings adequately. The coils 10 and 11 with cores 12 and 13 are converted into momentary electro-magnets to produce an intense magnetic field to permanently magnetize the strings 7 which retain their magnetism for a long time. I have found that a steady magnetizing direct current cannot be maintained through the coils 10 and 11 at the same time that the device translates the string vibrations, because of the high objectionable noise level thereby produced, due to the strong current and high magnetic intensity producing a hiss and noises of the Barkhaussen effect, with the high amplification required.

The position of the translating device 6, at the sound hole, produces the best quality of tone. At that point the steel strings are vibrating without an excessive amount of harmonics, such as near the bridge 43.

At or near the sound hole the device must be kept at a considerable distance from the steel strings so that it will not interfere with the act of playing. At this distance the important influence, for proper pick-up action, is the permanent magnetism inherent in the steel strings themselves. After magnetization as in Figure 7, the field of magnetic force is found by actual test, to be that represented by the dotted lines in Figure 8. The steel string 7 divides magnetically into a series of magnetized zones 44, 45, 46 and 47 of reversed polarity in adjacent zones. The regions of maximum magnetic density 48, 49, 50 and 51, coincides with the positions of the cores 39, 40, 41 and 42 from which arose the original magnetizing force represented by 52, 53, 54 and 55 in Figure 7. This condition is also that of maximum pick-up action.

It was generally held, in the prior art, for magnetic devices of somewhat similar purpose, that the steel strings behaved as armatures to vary the reluctance of the magnetic path. I have found, in my invention, that the steel strings constitute a source of vibrating magnetic field, when in vibration, and that the field of magnetic force, illustrated in Figure 8, vibrates in space in consonance with the vibration of the steel string 7. The regions of maximum magnetic density, 48, 49, 50 and 51 shift rapidly allowing varying amounts of lines of force to be linked in the cores 39, 40, 41 and 42, and thereby inducing corresponding currents in the coils 35, 36, 37 and 38, referring to Figure 8.

After the strings are magnetized it is possible to reduce the intensity of the treble notes if they are deemed too loud with respect to the bass. The procedure is to shift, towards or away from the bridge, the end 56, Figure 4 while being careful not to change the position of the other end with respect to the magnetized zones on the strings. The result may be represented in Figure 8 for the treble strings only by the regions of maximum magnetic density not entirely coinciding with the cores 39, 40, 41 and 42, thereby producing less pick-up action at these places.

Figure 8:
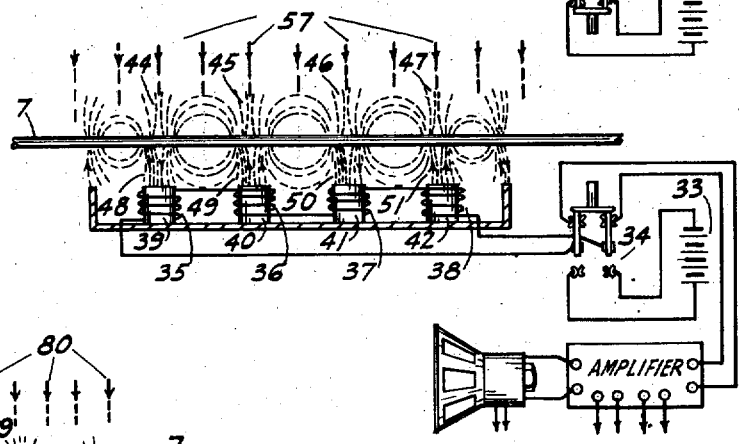
Figure 8 is a diagrammatic view of the invention somewhat similar to Figure 7, but showing the magnetic lines of force surrounding the steel string after magnetization, an interfering stray field, an amplifier and loud speaker.

In Figure 8, 57 represents generally a vertical instantaneous component of a stray interfering magnetic field. It will be observed that this interfering stray field, due to some extraneous cause, is of uniform direction and density over the region occupied by the translating device. Its inductive action on adjacent coils is equal, and since these are wound in opposite directions, the interfering stray currents are neutralized. On the other hand, the magnetic fields of the steel strings are of reversed polarity, such as 48, 49, and 50, 51. When vibrating, these will induce cumulative currents in the coils, 35, 36, 37 and 38, which are relatively insensitive to other influences. Stray interfering fields are seldom heterogeneous over the small region occupied by this translating device. However, by using a larger number of smaller electromagnets, more satisfactory results may be obtained, to take care of extreme conditions.

Figure 5:
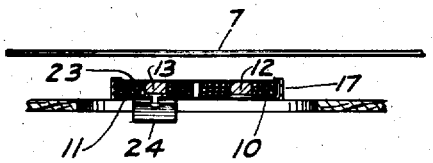
Figure 5 is a sectional view through the line 5—5 of Figure 3.
Figure 9:
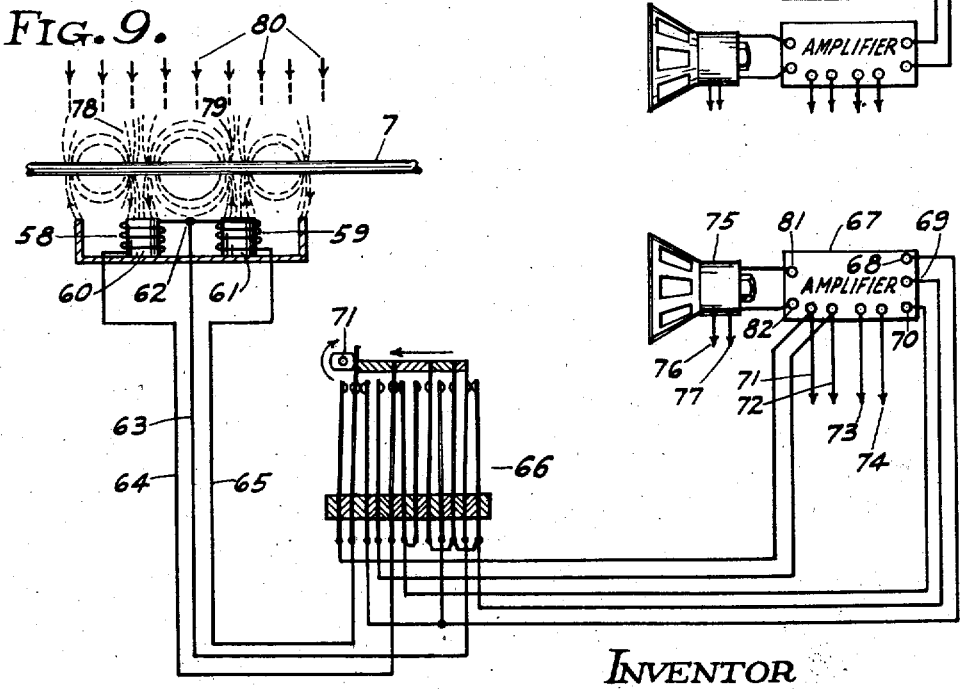
Figure 9 is a diagrammatic view showing the translating device with two coils and cores, the lines of magnetic force surrounding the steel string after magnetization, an interfering stray field, a switch held in the playing position, an amplifier and loud speaker.

Figure 9 is a diagrammatic view of the translating device, of which Figure 3, Figure 4 and Figure 5 show constructional views. The pick-up device has two reversed windings, 58 and 59 and cores 60 and 61. The windings are connected together at 62, and to a common return lead 63. The two outer leads 64 and 65 connect to the coils and are let together with 63 to the switch generally designated 66.

In the instance shown the switch is in playing position with leads 63 and 64 and 65, connected directly to the amplifier 67, of which 68, 69 and 70, is the tandem input. This is also referred to in the art as a push-pull input. When 71 is turned the switch restores to normal position by springing action. In this position the input 68, 70, is shunted to 69, stabilizing the input which is connected directly to the grids of triodes and thereby prevent howling. Simultaneously lead 63 is opened and the leads of direct current 71 and 72 are connected to leads 64 and 65, furnishing direct current to the coils 58 and 59, to energize the same. This is the magnetizing position of the switch. At the amplifier 67 is shown leads 73 and 74, which furnish cathode current while 71 and 72, connect to a source of plate potential for the triodes of the amplifier.

The loud speaker 75, is shown with connections 76 and 77, leading to a source of potential to produce field excitation.

In the playing position shown in Figure 9, if the steel string 7 vibrates, the surrounding magnetic field 78 and 79 will also vibrate inducing currents in the coils 58 and 59, while being insensitive to the stray field 80, as above mentioned. The currents are applied to the input, 68, 69 and 70 of the amplifier 67, which amplifies them, and from the output 81 and 82 of the amplifier they are connected to the loud speaker 75, which translates the amplified currents into sounds.

Various changes may be made in my invention, by those skilled in the art, without departing from the spirit thereof, as set forth in the drawings, specification and claims.

I claim:

1. The combination, in steel stringed musical instruments, of a plurality of wire coils, iron cores contained within the said coils each having a face of equal distance to the strings, means for sending a direct current through the coils to produce a series of magnetized zones, in each steel string, with reversed magnetic polarity for adjacent zones whereby induced currents are established in the coils when the strings are vibrated, means for disconnecting the direct current, means for amplifying the induced currents and of translating them into sounds.

2. The combination, in steel stringed musical instruments of a purality of wire coils spaced in consecutive order and each having iron cores, means for sending a direct current through the coils to produce magnetic fields of opposite polarity in adjacent coils and magnetizing the strings therewith, whereby induced currents are established in the coils when the strings are vibrating.

3. The combination, in steel stringed musical instruments, of a plurality of insulated wire coils each having iron cores, a case made of magnetic material having an open top and a closed bottom and containing the wire coils within, bent sides on the case to hold a non-magnetic top cover, a spring having two free ends and a mid-section fastened to the outer bottom of the case and adapted to hold the same to the musical instrument at the sound hole, means for utilizing the said wire coils to produce a series of magnetized zones in each string whereby currents are induced in the coils when the strings are vibrating, an amplifier to increase the amplitude of the currents and a loud speaker to translate the amplified currents into sounds.

4. The combination, in steel stringed musical instruments, of two solenoids each adapted to produce electrical currents from the influence of vibrating magnetic fields, means for sending a direct current through the solenoids to magnetize adjacent portions of the steel strings in opposite magnetic polarity whereby strong electrical currents are produced from the cumulative effects of the solenoids when these currents are induced from the vibrations of the magnetized strings but minimizing the effects of stray magnetic fields from the neutralizing effects of the solenoids, an amplifier to amplify the currents and a loud speaker to translate the amplified currents into sounds.

5. The combination, in steel stringed musical instruments, of a plurality of solenoids with means cooperating therewith adapting the same to produce electrical currents from the influence of vibrating adjacent magnetic members, a case made of magnetic material open on one side and containing the solenoids within, means for sending a direct current through the solenoids to produce a series of magnetized zones in each steel string with opposite magnetic polarity for adjacent zones whereby strong vibrating currents are induced in the solenoids from their cumulative effects when the strings are vibrating, but minimizing the influence of stray magnetic fields, means for disconnecting the direct current, an amplifier to increase the amplitude of the vibrating currents, and a loud speaker to translate the amplified currents into sounds.

6. The combination, in steel stringed musical instruments, of a plurality of an even number of insulated wire coils having cores made of magnetic material, a case also made of magnetic material having an open top and a closed bottom and containing the wire coils within, means for fastening the case to the musical instrument below the strings with the top side facing the strings, a source of direct current, a switch to connect the coils to the source of direct current to produce a series of magnetic zones in each steel string whereby, when the strings vibrate, currents are induced in the coils and reinforced by their cumulative action while neutralizing stray magnetic influences, means on the said switch to disconnect the coils from the source of direct current and to connect the same to an amplifier to amplify the currents, and a loud speaker to translate the amplified currents into sounds.

7. The combination, with steel stringed musical instruments, of a series of insulated wire coils spaced in consecutive order and each having iron cores with faces equidistant to each steel string, an amplifier having triodes grid input, a source of direct current, a switch having a first position to connect the direct current to the wire coils and simultaneously shunt the triodes grid input producing a series of magnetized zones in each steel string, a second position of the switch to disconnect the first position connections, and simultaneously connect the wire coils to the triodes grid input thereby sending vibrating currents, induced in the coils when the strings are vibrated, through the amplifier which boosts the same, and a loud speaker to translate the boosted currents into sounds.

8. The method of electrically increasing the volume of steel stringed musical instruments, which consists in utilizing a plurality of electromagnets to magnetize steel strings into magnetic zones of opposing polarity for adjacent zones, utilizing the same coils to produce electrical currents when the strings are vibrated, amplifying the said currents and translating them into sounds.

9. The method of reducing noise when electrically amplifying the volume of steel stringed musical instruments which consists in utilizing a series of wire coils with adjacent coils connected in opposite polarity, utilizing the coils to magnetize portions of the steel strings into magnetic zones, and utilizing the same coils to produce currents when the strings are vibrated.

10. The method of adjusting the relative intensities of the bass and treble notes when electrically amplifying the sounds of steel stringed musical instruments which consists in utilizing a series of coils to magnetize portions of the steel strings, adjusting the relative positions of the coils with respect to the magnetic portions to obtain the desired relative intensities, and utilizing the coils to produce currents when the strings are vibrated.

11. The combination, in steel stringed musical instruments, of a series of wire coils spaced consecutively on one side of the strings, cores contained within each coil and each having a face substantially equidistant to each steel string and adapted to magnetize the strings when the coils are energized by a momentary direct current whereby currents are induced in the coils when the strings are vibrated.

12. The combination, in steel stringed musical instruments, of a plurality of wire coils each spaced consecutively, cores contained within each coil each having a face substantially equidistant to each steel string and adapted to magnetize each steel string into a series of magnetic zones of reversed polarity for adjacent zones and corresponding to the polarity of the coils when the said coils are momentarily energized by a direct current whereby currents are established in the coils when the strings are vibrated.

13. The combination, in steel stringed musical instruments, of a plurality of electromagnets, means for sending a momentary direct current through the said electromagnets to magnetize each steel string into magnetic zones of reversed polarity for adjacent zones whereby cumulative currents are induced in the electromagnets when the strings are vibrated.

14. The combination, in steel stringed musical instruments of a plurality of wire coils spaced consecutively on one side of the steel strings, cores contained within the coils each having a face substantially of equal distance to each steel string, a case made of magnetic material having an open top and a closed bottom and containing the coils within, bent sides on the case to hold a non-magnetic top cover, a spring having two free ends and a mid-section fastened to the outer bottom of the case and adapted to hold the same to the musical instrument, and means for sending a momentary direct current through the coils to magnetize each steel string whereby currents are induced in the coils when the strings are vibrated.

15. The combination, in steel string musical instruments, of solenoidal means to magnetize the steel strings by a direct current of short duration, and means also solenoidal to electrically translate vibrations of the magnetized strings.

16. The combination, in steel stringed musical instruments, of solenoidal means to magnetize the steel strings by a direct current, means to disconnect the direct current, and means also employing the first mentioned solenoidal means to electrically translate vibrations of the magnetized strings.

17. The combination, in steel stringed musical instruments, of a solenoid, a source of direct current, means to send the direct current through the solenoid to magnetize the said steel strings, means to disconnect the direct current, and means for utilizing the solenoid to electrically translate the vibrations of the magnetized strings.

18. The combination, with steel stringed musical instruments, of a solenoid, means for sending a momentary direct current through the solenoid to magnetize the steel strings whereby currents are induced in the solenoid when the strings are vibrated.

19. The combination, in steel stringed musical instruments, of a wire coil containing a core made of magnetic material, means for utilizing the said wire coil to magnetize portions of the steel strings by a direct current of short duration, and means for utilizing the same wire coil to produce currents when the strings are vibrated.

20. The combination, in steel stringed musical instruments, of a case made of magnetic material having an open top and a closed bottom, bent sides on the case to hold a non-magnetic top cover, a spring having two free ends and a mid-section fastened to the outer bottom of the case and adapted to hold the same to the musical instrument, and solenoidal means contained within the case to electrically translate vibrations of the steel strings.

21. The combination, in steel stringed musical instruments, of a case with portions thereof made of magnetic material, a spring having two free ends and a mid-section fastened to the said case, and means contained within the case to electrically translate vibrations of the steel strings.

22. The method of electrically increasing the volume of steel stringed musical instruments which consists in utilizing a wire coil to magnetize portions of the steel strings by a magnetic influence of short duration, and utilizing the same wire coil to produce currents when the strings are vibrated and amplifying the said currents and translating them into sounds.

23. The method of electrically amplifying the volume of vibrating steel strings or members which consists in utilizing a momentary magnetic influence to magnetize portions of the said strings or members, and utilizing a coil to produce currents when the said steel strings or members are vibrated and amplifying the said currents and translating them into sounds.

24. The method of adjusting the relative intensities of the bass and treble notes when electrically amplifying steel string musical instruments which consists in utilizing magnetized portions of the steel strings and adjusting the position of a wire coil with respect to the magnetized portions to obtain the desired relative intensities and amplifying the said currents and translating them into sounds.

25. The combination in steel stringed musical instruments having a plurality of substantially parallel strings, a series of wire coils, each having a core, the faces of all of the cores being substantially in the same plane, the face of each core being substantially equidistant to each string and each core positioned to register with all of the strings of the instrument and means for utilizing the said wire coils to produce currents when the strings are vibrated.

ARNOLD LESTI.